Jan. 26, 1943.　　　O. K. CAZIN　　　2,309,382
CAMERA MECHANISMS
Filed March 26, 1940　　　5 Sheets-Sheet 1

INVENTOR.
Otto K. Cazin
BY
ATTORNEY.

Jan. 26, 1943. O. K. CAZIN 2,309,382
CAMERA MECHANISMS
Filed March 26, 1940 5 Sheets-Sheet 2

Jan. 26, 1943.    O. K. CAZIN    2,309,382
CAMERA MECHANISMS
Filed March 26, 1940    5 Sheets-Sheet 3

INVENTOR.
Otto K Cazin
BY
his
ATTORNEY.

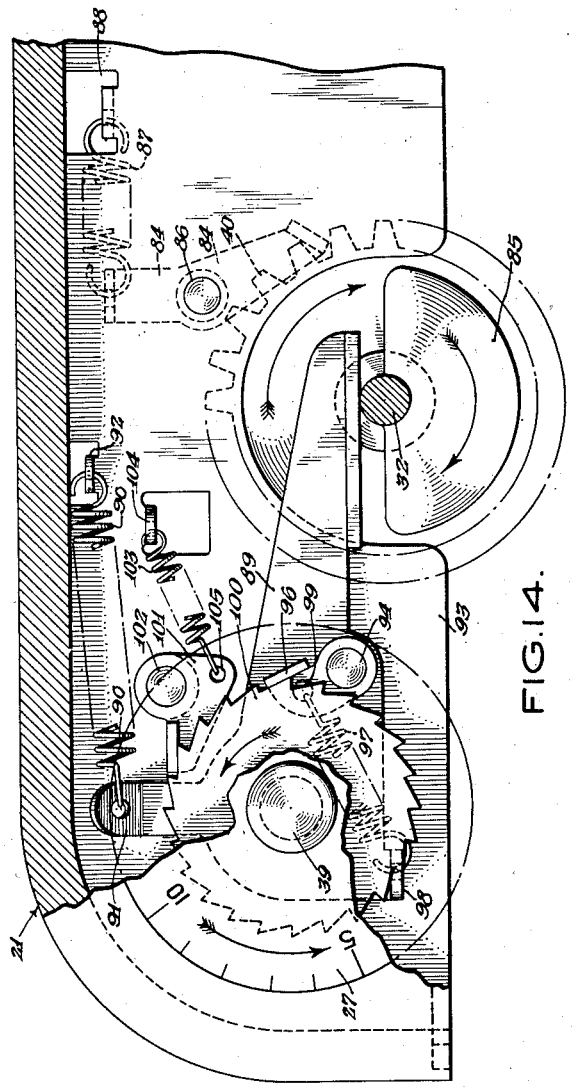
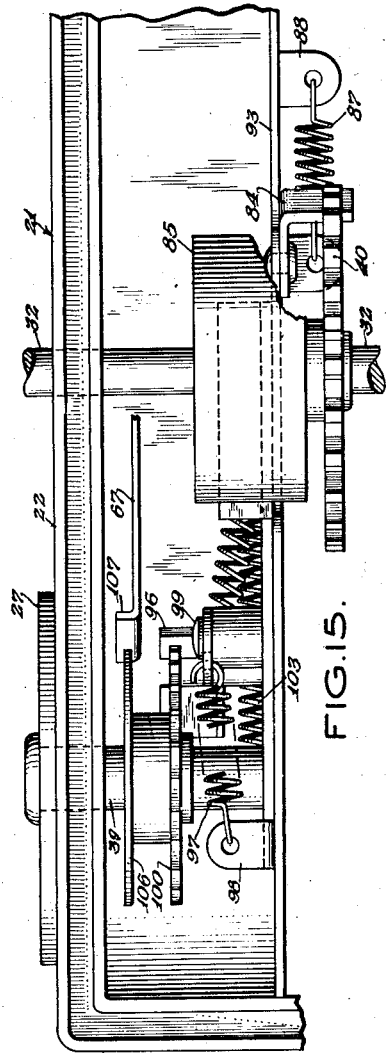

INVENTOR.
Otto K Cazin
BY
his
ATTORNEY.

Patented Jan. 26, 1943

2,309,382

UNITED STATES PATENT OFFICE 2,309,382

CAMERA MECHANISM

Otto K. Cazin, Hoboken, N. J., assignor to Universal Camera Corporation, New York, N. Y., a corporation of New York Application March 26, 1940, Serial No. 326,073

11 Claims. (Cl. 95—31)

This invention relates to cameras, and more particularly to novel tripping means and associated interlocking arrangements for camera shutters In accordance with the present invention, novel means are provided for preventing actuation of the shutter before the film has been advanced from the exposed to the next unexposed frame, and for preventing winding of film when in position for exposure, until the shutter is tripped to expose the positioned frame. The means comprises a member arranged to lock the film winding shaft until the shutter has been actuated, and also to prevent actuation of the shutter trip button before the winding shaft is turned to advance the film to the next frame, the locking member being coupled to and controlled by the shutter tripping mechanism.

A further important feature of the present invention resides in an arrangement permitting uninterrupted winding of the film for the initial "leader" portion thereof as well as the "trailer" portion. This arrangement is correlated with the shutter trip locking means referred to and renders the latter ineffective during winding of the "leader" and "trailer" portions of the film. In the preferred embodiment, a cam is intermittently advanced in accordance with the film winding operations, and suitably actuates the locking means in accordance with its angular position, such control cam being coupled to the film exposure counter, the assembly thereby being compact and foolproof in operation.

It is accordingly an object of the present invention to provide a novel arrangement for preventing tripping of the shutter until a fully unexposed film frame is in position for exposure.

Another object of the present invention is to provide a novel arrangement for preventing advancement of the film until the shutter is actuated for exposing a film frame.

Still another object of the invention is to provide a novel interlocking arrangement actuated by the shutter mechanism to control the operation of the shutter trip button and film winding mechanism.

A further object of the present invention is to provide a novel arrangement for uninterruptedly transporting the "leader" and "trailer" portions of the film while permitting successive individual frame exposures in the intermediate film section.

Still a further object of the present invention is to provide a novel arrangement for rendering the film winding locking means ineffective during "leader" and "trailer" film winding operations to permit uninterrupted winding of the film for these portions thereof.

These and further objects of the present invention will become more evident in the following description taken in connection with the drawings, in which:

Figure 14 is an enlarged fragmentary view, in section, of the indicating dial and associated operating mechanism, as taken along the line 14—14 of Figure 2.

Figures 15 and 16 are respectively bottom and end views of the mechanism of Figure 14.

General description of the camera

Figure 1:
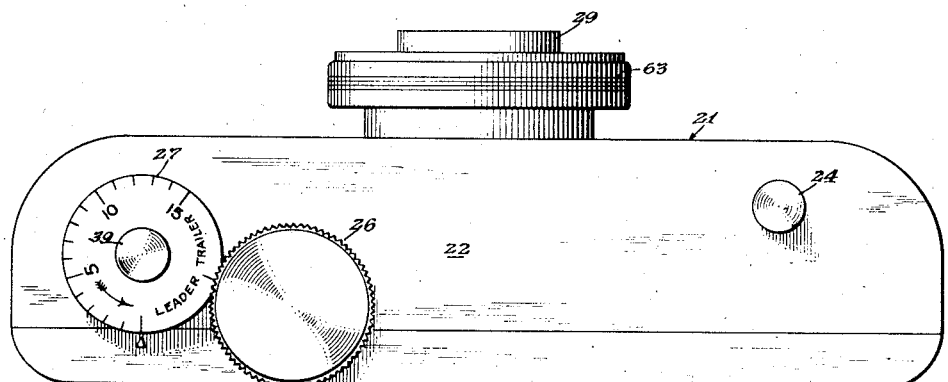
Figure 1 is a top view of a camera embodying the principles and mechanism of the present invention.
Figure 2:
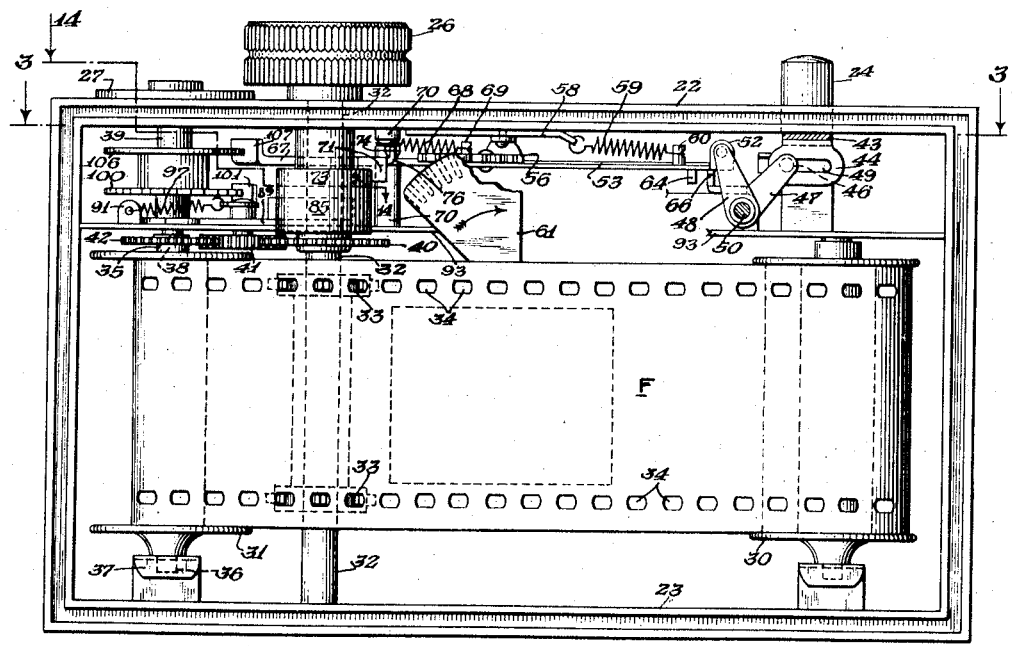
Figure 2 is an inside view of the camera, with the back cover removed.
Figure 3:
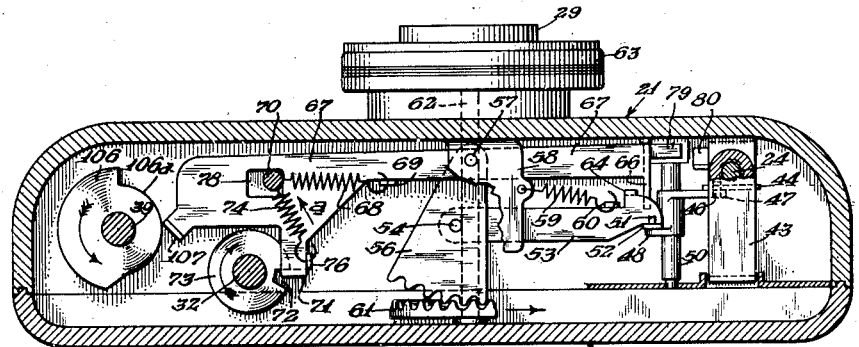
Figure 3 is a horizontal cross-sectional view through the camera, taken along the line 3—3 of Figure 2, showing the shutter tripping and film transport mechanisms.

Referring particularly to Figures 1, 2 and 3, the camera embodiment comprises back cover 20, front housing 21, top cover section 22 and bottom cover section 23. The camera contains a trip button 24, a film winding knob 26, a film exposure indicator 27, and a lens aggregate or objective 29. The shutter setting means, and other accessories such as a range and view finder are not shown in the drawings, since they do not form part of the present invention.

The film transport mechanism is shown in Figure 2. This mechanism comprises a winding knob 26 used to wind film F from take-off spool 30 onto take-up spool 31. Winding knob 26 is fastened to winding shaft 32 carrying film sprockets 33, 33 which engage edge perforations 34 of film. Take-up spool 31 is rotatably supported between bearing 37 carrying pin 36 of the spool, and fixed conical pin 38 coacting with a socket in post 35 extending from spool 31.

A gear 40, secured on winding shaft 32, drives idler pinion 41 meshing with gear 42 mounted on spool post 35. When winding knob 26 is rotated, sprockets 33, 33 advance film F onto take-up spool 31, and take-up spool 31, driven by gear train 40, 41, 42, holds the wound film taut, through a friction drive of the character disclosed in co-pending applications, Serial Nos. 204,102 and 204,103, filed April 25, 1938, in the name of Kende and Brownscombe.

The shutter mechanism of the camera is incorporated in the objective lens structure 29 generally indicated at 63. The construction of the shutter may be of the character disclosed in co-pending application Serial No. 301,720, filed October 28, 1939 in the name of Kende and Cazin. The shutter at 63 is operated by the rotation of shaft 62 connected therewith in response to a downward actuation of trip button 24. A carriage plate 43 and a rocking lever guide 44 are coupled with trip button 24. Pin 46 on arm 47 of rocking lever 47, 48 engages slot 49 in guide 44. When trip button 24 is depressed, guide 44 moves downwardly, causing rocking lever 47, 48 to rotate in a clockwise direction. Lever 47, 48 is mounted on rod 50. Lever arm 48 is provided with a pin 51 engaging lug 52 on shutter bar 53. Shutter bar 53 is mounted on pin 54 of shutter drive segment gear 56, which is in turn rotatably mounted on pin 57. Pin 57 is secured with shutter drive plate 58, supporting a spring 59 fastened to lug 60 of shutter bar 53. Spring 59 mechanically biases shutter 53 towards the left.

When trip button 24 is pressed downwards, lever 47, 48 is rotated clockwise, and shutter bar 53 is pulled to the right against the action of spring 59. Shutter drive segment gear 56 motivates shutter segment gear 61 in right angular relation, causing gear 61 to rotate clockwise. Gear 61 is secured to shutter operating shaft 62. Details of the shutter mechanism are not illustrated since optional arrangements may be employed. The shutter may be incorporated in the casing indicated at 63, or elsewhere within the camera, as will be understood by those skilled in the art.

The shutter mechanism may be operated for instantaneous, bulb or time exposures, as is well known in the art. When the shutter mechanism is adjusted for instantaneous exposure, the shutter thereof wilfl be fully tripped when shutter gear 61 has completed its clockwise angular rotation in response to the depression of the trip button 24. Shutter gear 61 will thereupon be enabled to return to its original position due to the biasing action of spring 59 when trip button 24 is released. When the shutter is arranged for bulb exposure, the shutter will remain open when trip button 24 is pressed downwards. The shutter will not again close until it is permitted to do so by the release of the trip button 24.

When arranged for time exposure, the shutter remains open when trip button 24 is pressed down fully. However, the release of trip button 24 will allow the shutter gear 61 to return only partially due to the action of the shutter mechanism during the time exposure. Shutter gear 61 and the other coacting parts of the shutter tripping mechanism will return to their original position only upon a second downward actuation of trip button 24 as will be understood by those skilled in the art.

*Double exposure prevention*

An important feature of the present invention resides in arrangements for preventing double exposure of any film section. This is accomplished with a locking member actuated in conjunction with the shutter mechanism. The member is normally interlocked with the winding shaft preventing that shaft from rotating. When the trip button is depressed to operate the shutter mechanism, the locking member is thereby actuated to prevent the trip button from reoperating and simultaneously unlocks the winding shafts. When the exposed film section is removed, and the new film section is wound in position, the locking member thereupon relocks the winding shaft and permits the trip button to again operate. Referring now particularly to Figures 2 and 3, the locking element referred to is member 67 which is herein termed the locking bar.

When trip button 24 is pressed downwardly, shutter bar 53 is thereupon pulled to the right. When the bar 53 has traversed about half of its excursion, lug 64 of shutter bar 53 engages projection 66 of locking bar 67. Shutter bar 53 thus carries locking bar 67 along for the remainder of its excursion. This movement of locking bar 67, to the right in Figure 3, is opposed by spring 68 mounted between lug 69 of locking bar 67 and post 70. As locking bar 67 travels to the right by the intermediary of shutter bar 53, lug 71 of locking bar 67, moves out of engagement with notch 72 on locking cam 73. Locking cam 73 is secured to film winding shaft 32.

Figure 4:
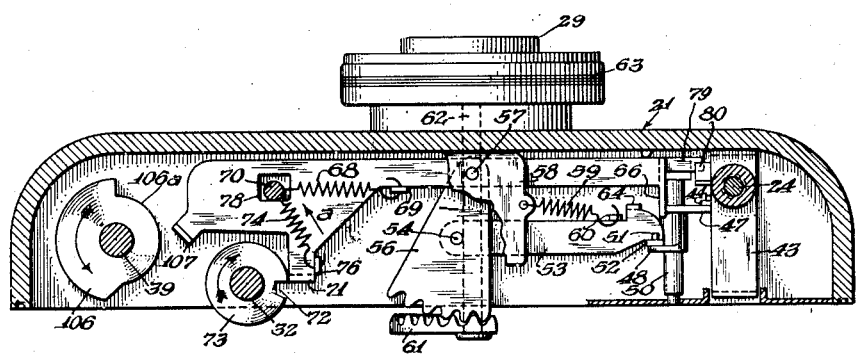
Figures 4 and 5 are views corresponding to Figure 3, illustrating different positions of the shutter control mechanisms.

As lug 71 clears notch 72 of locking cam 73, spring 74, attached to post 70 and to lug 76 of locking bar 67, pulls locking bar 67 towards post 70 substantially in the inclined direction of arrow a, to the position thereof shown in Figure 4. Locking bar 67 is provided with an aperture 78 adjacent spring post 70, which permits transverse movement of locking bar 67, i. e. to the right or left.

Figure 4 shows the position of locking bar 67 after trip button 24 has been released and permitted to return. Due to biasing spring 74, lug 71 of locking bar 67 does not reengage with notch 72 of locking cam 73, but instead rests against the periphery of cam 73 to the right of its engaged position. In this position of bar 67, right hand projection 79 thereof interferes with the downward travel of trip catch 80 mounted on trip button 24, preventing the latter from being pressed down.

When winding knob 26 has been turned through a complete revolution, thereby advancing the film one frame, lug 71 of locking bar 67 again falls into notch 72 in locking cam 73. This action, while pulling locking bar 67 forward, i. e. substantially opposite to the direction of arrow a and away from spring post 70, permits locking bar 67 to travel laterally toward spring post 70. This combined movement of locking bar 67, exercised under the influence of springs 68 and 74, moves the extreme right hand projection 78 of locking bar 67 from under trip catch 80. The trip button 24 assembly is thereupon in condition to be pressed downwardly for exposure of the frame in position.

The action of trip catch 80 is shown in greater detail in Figures 6 to 13 corresponding to the different positions of trip button 24. Trip catch 80 is rotatably mounted on shaft 81 of button carriage plate 43. Spring 82 pressing against carriage plate 43 tends to prevent rotation of trip catch 80 in a counterclockwise sense. These figures are in pairs, showing respective side and end views of the mechanism.

Figure 6:
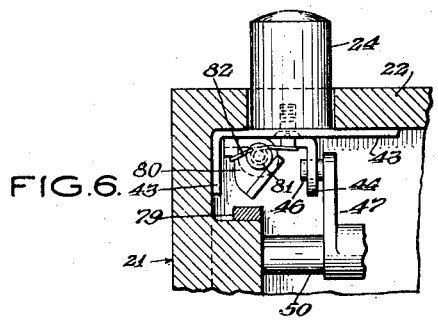
Figures 6 to 13 are enlarged fragmentary views, in section, illustrating the relation of the coacting parts for different positions of the shutter trip button.
Figure 7:
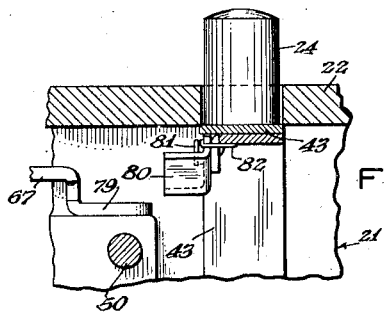

In Figures 6 and 7 the relative position of trip catch 80 with locking bar projection 79 corresponds to the position of locking bar 67, shown in Figures 2 and 3. Here trip button 24 is in position to be tripped. Trip catch 80 is thus free to move clear of locking bar projection 79 when trip button 24 is depressed.

Figure 8:
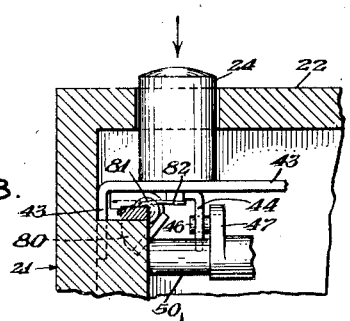
Figure 9:
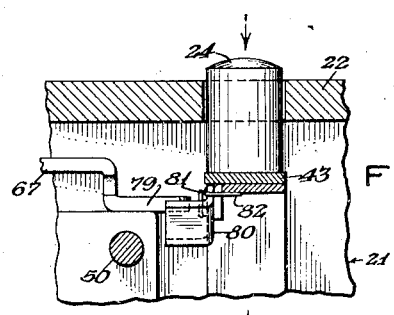

In Figures 8 and 9 the relative position of trip catch 80 and locking bar end 79 shown, corresponds to when trip button 24 is pressed all the way down as indicated by the arrow. Projection 79 here corresponds to its position in Figure 4, abutting trip catch 80.

Figure 10:
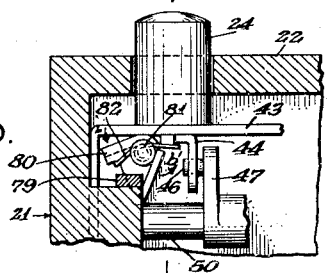
Figure 11:
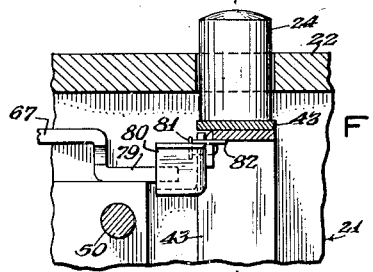

Figures 10 and 11 show the relative position of trip catch 80 and locking bar end 79 during the upward traverse of trip button 24. Trip catch 80 here rotates against the action of spring 82 through a counterclockwise angle, and slips past locking bar end 79 as indicated by arrows b, b'. After locking bar projection 79 has passed trip catch 80, the latter returns to its original position as shown in Figures 12, 13.

Figure 12:
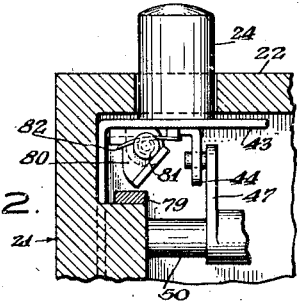
Figure 13:
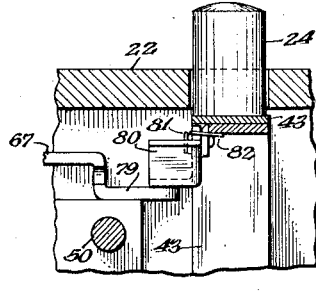

Figures 12 and 13 show the interference between trip catch 80 and locking bar end 79 when an attempt is made to trip shutter 63, by depressing button 24 before the film has been advanced another frame. Double exposure of a frame is thus effectively prevented.

As shown in Figures 2 and 3, the position of locking bar 79 is such as to permit tripping of shutter 63. At the same time, lug 71 of locking bar 67 engages notch 72 of locking cam 73 on winding shaft 32, and cutout section 78 of locking bar 67 is held against spring post 70. Thus, winding shaft 32 is prevented from turning and there can be no film transport before shutter 63 has been tripped by trip button 24.

*Uninterrupted film transport*

A further important feature of the present invention resides in the novel arrangement for winding the film uninterruptedly during the initial "leader" portion thereof as well as the final "trailer" portion after the film exposure. The intermediate section of the film is exposed one at a time in a manner hereinabove described in connection with the trip button and shutter operations. A cam is provided in cooperative relationship with the film winding shaft and is motivated in accordance with the film exposures made.

When the predetermined number of film exposures have been taken, the cam coacts with the locking bar 67 hereinabove described and moves the locking bar into disengagement with the film winding shaft and into engagement with the trip button to prevent its actuation during this interval. The winding shaft is thereupon permitted to be rotated without interruption until the film is fully wound onto the take-up spool 31. The film winding shaft is held in this condition during the reinsertion of a new roll of film and the "leader" portion of the film is wound on the take-up spool 31 in a manner to be described in more detail hereinafter. The locking bar 67 is returned to its normal operation condition when the "leader" portion of the film has been transported, and the first frame is in position for exposure.

Figure 17:
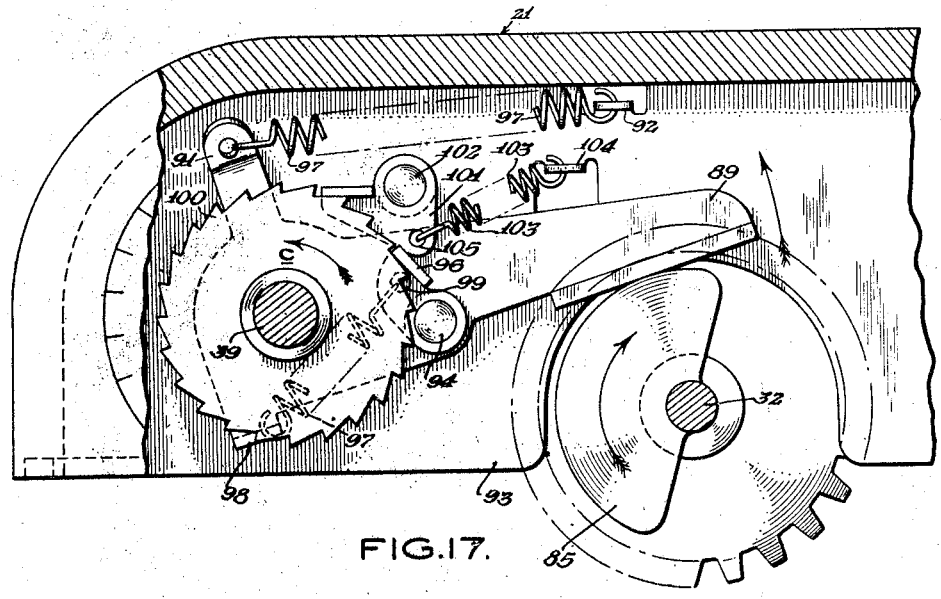
Figure 17 is a fragmentary view corresponding to Figure 14, in a different operating position.
Figure 16:
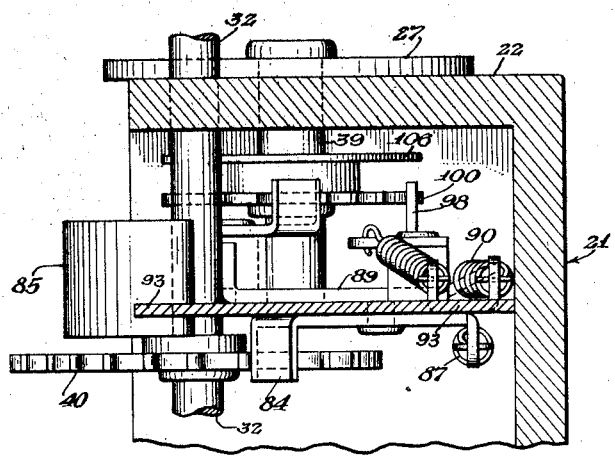

Before describing the details of the uninterrupted film transport arrangement, the exposure counter and its associated mechanism will be first explained, reference being had particularly to Figures 14 to 17. Figures 14, 15 and 16 are respectively fragmentary top, bottom and end views thereof, on an enlarged scale. Figure 17 is a view similar to Figure 14 showing a different operating position of the indicator dial and associated parts.

Gear 40 on film winding shaft 32 coacts with a pawl 84, which serves to prevent the turning of winding shaft 32 in a reverse direction. Pawl 84 is pivoted on post 86 and pressed against gear 40 by spring 87 fastened on projection 88 of mechanism plate 93. When rotated in its proper clockwise direction, the teeth of winding shaft gear 40 move past pawl 84. If an attempt is made to turn winding shaft 32 in a counterclockwise direction, the teeth of gear 40 engage with pawl 84 to prevent reverse winding thereof.

The winding shaft locking cam 73, which is cylindrical except for notch 72 (Figures 3 to 5), has an adjacent semi-circular cam section 85. Semi-circular cam 85 operates exposure counter 27 in a manner to be described. A lever 89 is loosely mounted on indicator shaft 39. A spring 90 is fastened between projection 91 of lever 89 and on lug 92 of the mechanism plate 93. Indicating lever 89 is thus spring biased towards winding shaft 32. Spring 90 thus insures a positive contact between indicating lever 89 and either winding shaft 32 or the surface of semi-circular cam 85 (Figure 14). Indicator lever 89 is provided with pin 94 for supporting a pawl 96. A spring 97, fastened between lug 98 of indicating lever 89 and ear 99 of pawl 96, presses pawl 96 against a ratchet 100 fixed on indicator shaft 39.

Figure 17 illustrates the action of indicating lever 89 during the advancement of a frame. As winding shaft 32 is turned by winding knob 26, indicator lever 89 rides on semi-circular cam 85, and pivots about indicator shaft 39 counterclockwise, as shown by arrow c. Ratchet 100 is engaged by pawl 96 which is turned counterclockwise at an angle equal to that executed by indicator lever 89. When the film has advanced one frame, indicator lever 89 is returned to its original position with its upstanding edge contacting the winding shaft 32 by the action of spring 90, as shown in Figure 14.

As indicator ratchet 100 is turned, it advances one tooth over pawl 101 mounted on shaft 102 of mechanism plate 93. Pawl 101 is tensioned by spring 103 fastened between lug 104 of plate 93 and hole 105 in pawl 101. Upon the return of indicator lever 89 to its original position, pawl 101 prevents ratchet 100 from turning. In this manner, ratchet 100 advances tooth by tooth corresponding to the film advance, frame by frame by winding knob 26.

Ratchet 100, shaft 39 and indicator dial 27 rotate as a single unit. Indicator dial 27 is graduated in such manner, that the advance of one tooth of ratchet 100 will move dial 27 by one graduation opposite the index. When the film roll is first inserted into the camera, dial 27 is manually set to indicate the beginning or "leader" portion of the film roll. After winding shaft 32 has been turned uninterruptedly a sufficient number of times to advance the film for the first frame exposure, dial 27 will have advanced the proper angle to indicate frame No. 1. Each successive frame advance is thereupon indicated on the scale of indicator 27. When all frames have been exposed, indicator dial 27 will have advanced to indicate "trailer," i. e. the end portion of the film roll, which is not intended to be exposed.

To permit uninterrupted film transport, a cam 106 is arranged to coact with locking bar 67. Cam 106 is secured on indicator shaft 39. The coaction of cam 106 with projecting lug 107 of the locking bar is evident in elevational Figures 3, 4 and 5. In Figure 3, the position of cam 106 with respect to projection 107 of locking bar 67 corresponds to the operation of the camera for successive frame advancing and exposure, locking bar 67 being permitted to move to its extreme left position under the action of biasing spring 68.

Figure 5:
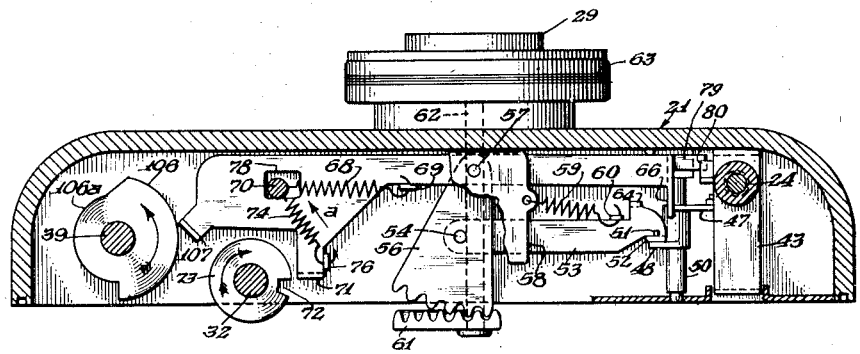

Upon successive advancement and exposure of the film frames, indicator shaft 39 is rotated step by step through the pawl and ratchet 100—101 arrangement described, with corresponding indications by exposure indicator 27. When all the frames have been properly advanced and exposed, indicator shaft 39 will have been rotated counterclockwise until the projecting portion of cam 106 coacts with projecting lug 107 of locking bar 67. Figure 5 shows such coaction of cam 106 and lug 107, whereupon locking bar 67 is moved towards the right and held in that position.

Locking bar 67 is thus arrested or locked in the position illustrated in Figure 5, to the right, disengaging projecting lug 71 thereof from slot 72 of winding shaft cam 73. In this position, extreme right projection 79 of locking bar 67 moves beneath trip catch 80 and prevents the trip button 24 from actuating the shutter mechanism. Trip button 24 is thereupon locked in its upper position, and winding shaft 32 is free to be rotated to wind up film F upon pick-up spool 31. The uninterrupted film transport is feasible in view of the prevention of engagement between cam 73 and projection 71 of locking bar 67.

As winding shaft 32 is rotated through winding knob 26, semi-circular cam 85 is correspondingly rotated to actuate lever 89 and advance the indicator shaft 39 step-by-step through pawl and ratchet 100, 101. The "trailer" section of the film is uninterruptedly wound upon spool 31, and cam 106 is advanced about one-fourth revolution in the illustrated embodiment, for the "trailer" section, which is indicated correspondingly by indicator 27.

Locking bar 67 remains locked in position, to the right, by cam 106 until a fresh roll of film is inserted in the camera, the indicator dial is manually set to starting point, if the same is not clearly at such point, and the "leader" portion thereof is uninterruptedly wound onto the take-up spool at 31. Cam 106 is further rotated counterclockwise by indicator shaft 39, and indicator 27 shows up "leader." When the "leader" portion is fully wound up in an uninterrupted manner, the raised surface portion of cam 106 is advanced sufficiently to permit locking bar 67 to be biased towards the left by spring 68 against the inner surface portion 106a of cam 106.

The design of cam 106 and the coacting advancing mechanism for indicator shafts 39 and indicator 27 corresponds to the film used, in order that when the first film frame is in position for exposure, locking bar 67 will be biased to the left by spring 68 and engage notch 72 of cam 73 to lock the winding shaft and also disengage trip catch 80 to permit the shutter tripping mechanism to be actuated through trip button 24. The operation of the camera as to exposure and film advancement corresponds to that hereinabove described wherein an unexposed frame cannot be advanced until the shutter mechanism is actuated through trip button 24, as well as the prevention of double exposure of the film before advancement thereof to the next frame.

It is obvious that various changes and modifications may be made to the details of construction of the disclosed camera embodiment without departing from the broader spirit and scope of the invention as set forth in the following claims.

What I claim is:

1. In a camera having a shutter and a winding member for advancing the film; mechanism for operating said shutter including a linearly movable trip button, and an element pivoted on said button actuable for depression and return for displacement during the return movement of the button; and apparatus actuated by said shutter operating mechanism comprising a portion moved into the path of said element after said trip button is depressed, said element being arranged to be turned on its pivot out of said path, to permit said trip button to be restored to initial position and to then return and abut said portion to render said trip button inoperative for reactuation until said film winding member is operated to advance the film to the next frame.

2. In a camera having a shutter and a winding member for advancing the film; mechanism for operating said shutter including a linearly movable trip button actuable for depression and return, and an element pivoted on said button, for displacement during the return movement of the button; and apparatus actuated by said shutter operating mechanism for locking said film winding member from advancing the film until said trip button is actuated to expose the positioned film frame comprising a reciprocable locking bar coupled with said shutter operating mechanism and having an integral portion movable into the path of said element after said trip button is depressed, said element being arranged to be turned on its pivot around said portion out of said path, to permit said trip button to be restored to initial position and to then return and abut said portion to lock it in an inoperative condition.

3. In a camera having a shutter and a winding member for advancing the film; mechanism for operating said shutter including a linearly movable trip button for depression and return and an element pivoted on said button actuable for displacement during the return movement of the button; and apparatus actuated by said shutter operating mechanism for rendering said trip button inoperative for reactuation until said film winding member is operated to advance the film to the next frame comprising a longitudinally reciprocable locking bar having a portion moved into the path of said element after said trip button is depressed, said element being arranged to be contacted by said portion and turned on its pivot out of said path, to permit said trip button to be restored to initial position and to then return and abut said portion to lock it in the inoperative condition, and a locking cam connected with said film winding member, a section of said locking bar being engageable with said locking cam for arresting the operation of said film winding member.

4. In a camera having a shutter and a winding member for advancing the film; mechanism for operating said shutter including a linearly movable trip button for depression and return, and an element depending from said trip button and mounted for displacement on the return movement thereof; and apparatus actuated by said shutter operating mechanism for locking said film winding member from advancing the film until said trip button is actuated to expose the positioned film frame and for rendering said trip button inoperative for reactuation until said film winding member is operated to advance the film to the next frame comprising a longitudinally reciprocable locking bar coupled with said shutter operating mechanism and having a portion successively engageable with said trip button element for displacing the same and permitting said trip button to be restored to initial position after actuation and to then lock it in the inoperative condition.

5. In a camera having a shutter and a winding member for advancing the film; mechanism for operating said shutter including a linearly movable trip button for depression and return, and an element depending from said trip button and mounted for displacement on the return movement thereof; and apparatus actuated by said shutter operating mechanism for locking said film winding member from advancing the film until said trip button is actuated to expose the positioned film frame and for rendering said trip button inoperative for reactuation until said film winding member is operated to advance the film to the next frame comprising a longitudinally reciprocable locking bar coupled with said shutter operating mechanism and having a portion successively engageable with said trip button element for displacing the same and permitting said trip button to be restored to initial position after actuation and to then lock it in the inoperative condition, and a locking cam connected with said film winding member, a section of said locking bar being engageable with said locking cam for arresting the operation of said film winding member alternately with the engagement of the bar portion with said trip button element.

6. In a camera having a shutter and a winding member for advancing the film; mechanism for operating said shutter including a linearly movable trip button for depression and return, an element depending from said trip button and pivoted thereon for displacement during the return movement of said button; and apparatus actuated by said shutter operating mechanism for locking said film winding member from advancing the film until said trip button is actuated to expose the positioned film frame and for rendering said trip button inoperative for reactuation until said film winding member is operated to advance the film to the next frame comprising a locking bar reciprocable in a path perpendicular to the pivoting plane of said element and directly coupled with said shutter operating mechanism, said bar having an extending portion successively engageable with said trip button element, said element being arranged to be turned around said portion out of said path, to permit said trip button to be restored to initial position and to then abut said portion to lock it in the inoperative condition.

7. In a camera having a shutter and a winding member for advancing the film; mechanism for operating said shutter including a linearly movable trip button for depression and return, an element depending from said trip button and pivoted on said button and mounted for displacement on the return movement thereof; apparatus actuated by said shutter operating mechanism for locking said film winding member from advancing the film until said trip button is actuated to expose the positioned film frame and for rendering said trip button inoperative for reactuation until said film winding member is operated to advance the film to the next frame comprising a longitudinally reciprocable locking bar coupled with said shutter operating mechanism and having a portion successively engageable with said trip button element, said element being arranged to be turned around said portion out of its path, to permit said trip button to be restored to initial position and to then abut said portion to lock said button in the inoperative condition; a locking cam connected with said film winding member, a section of said locking bar being engageable with said locking cam for arresting the operation of said film winding member alternately with the locking engagement of the bar portion with said trip button element; and means for holding said bar section in engagement with said cam and said bar portion out of engagement with said trip button element until said trip button is actuated to operate said shutter mechanism and for holding said bar portion in locking engagement with said trip button and said bar section out of engagement with said cam until said film winding mechanism is operated to advance the film to the next frame.

8. In a camera having a shutter and a winding member for advancing the film; mechanism for operating said shutter including a linearly movable trip button for depression and return, and an element depending from said trip button and mounted for displacement on the return movement thereof; and apparatus actuated by said shutter operating mechanism for locking said film winding member from advancing the film until said trip button is actuated to expose the positioned film frame and for rendering said trip button inoperative for reactuation until said film winding member is operated to advance the film to the next frame, comprising a longitudinally reciprocable locking bar coupled with said shutter operating mechanism, said bar having an integral portion successively engageable with said trip button element for permitting said trip button to be restored to initial position after actuation and to then lock said button in the inoperative condition, a locking cam secured to said film winding member, a section of said locking bar being engageable with a notch in said locking cam when said bar is reciprocated in the direction away from said element for arresting the operation of said film winding member alternately with the engagement of the bar portion with said trip button element, and means for normally holding said bar section in engagement with said cam notch and said bar portion out of engagement with said trip button element until said trip button is actuated to operate said shutter mechanism and for holding said bar portion in locking engagement with said trip button and said bar section out of engagement with said cam notch until said film winding mechanism is operated to advance the film to the next frame including spring means for normally biasing said bar section in a direction against said cam and at a transverse angle with respect to the cam surface.

9. In a camera having a shutter and a winding member for advancing the film; mechanism for operating said shutter including a linearly movable trip button for depression and return; apparatus for normally locking said film winding member from advancing the film until said trip button is actuated to expose the positioned film frame, comprising a longitudinally reciprocable locking bar coupled with the shutter operating mechanism, said locking bar having a portion normally engageable with said film winding member and having another portion alternately engageable with said trip button for holding it from operative movement; and means actuated by said film winding member for rendering the locking of said member ineffective during a predetermined section of the film to permit uninterrupted film transport of the film section, comprising a transport cam, and a device coupling said transport cam with said winding member for advancing said transport cam step-by-step with the film transport, said transport cam being arranged to move said locking bar out of engagement with said film winding member and into engagement with said trip button until said predetermined film section is fully transported.

10. In a camera having a shutter and a winding member for advancing the film; mechanism for operating said shutter including a linearly movable trip button for depression and return; apparatus for rendering said trip button inoperative for reactuation until said film winding member is operated to advance the film to the next frame, comprising a locking bar coupled with said shutter operating mechanism; a locking cam connected with said film winding member, a section of said longitudinally reciprocable locking bar being engageable with said locking cam for arresting the operation of said film winding member; and means actuated by said film winding member for rendering the locking of said member ineffective during a predetermined section of the film to permit uninterrupted film transport of the film section and for locking said trip button against actuation during the transport of said film section comprising a transport cam, and a device coupling said transport cam step-by-step with the film transport, said transport cam being arranged to move said locking bar out of engagement with said locking cam and into engagement with said trip button element until said predetermined film section is fully transported.

11. In a camera having a shutter and a winding member for advancing the film; mechanism for operating said shutter including a linearly movable trip button for depression and return, and an element pivoted on said button for displacement during the return movement of the button; apparatus for rendering said trip button inoperative for reactuation until said film winding member is operated to advance the film to the next frame, comprising a longitudinally reciprocable locking bar coupled with said shutter operating mechanism, and having a portion moved into the path of said element after said trip button is depressed, said element being arranged to be turned on its pivot out of said path, to permit said trip button to be restored to initial position and to then abut said portion to lock it in the inoperative condition; a locking cam connected with said film winding member, a section of said locking bar being engageable with said locking cam for arresting the operation of said film winding member; and means actuated by said film winding member for rendering the locking of said member ineffective during a predetermined section of the film to permit uninterrupted film transport of the film section and for locking said trip button against actuation during the transport of said film section comprising a transport cam, and a device coupling said transport cam with said winding member for advancing said transport cam step-by-step with the film transport, said transport cam being arranged to move said locking bar out of engagement with said locking cam and into engagement with said trip button element until said predetermined film section is fully transported.

OTTO K. CAZIN.